(12) United States Patent
Kini et al.

(10) Patent No.: US 10,873,476 B2
(45) Date of Patent: Dec. 22, 2020

(54) NETWORKS WITH MULTIPLE TIERS OF SWITCHES

(71) Applicant: Big Switch Networks LLC, Santa Clara, CA (US)

(72) Inventors: Shrinivasa Kini, San Jose, CA (US); Sudeep Modi, Milpitas, CA (US); Prashanth Padubidry, San Jose, CA (US); Kiran Poola, Milpitas, CA (US)

(73) Assignee: Big Switch Networks LLC, Santa Clara, CA (US)

( * ) Notice: Subject to any disclaimer, the term of this patent is extended or adjusted under 35 U.S.C. 154(b) by 10 days.

(21) Appl. No.: 16/237,518

(22) Filed: Dec. 31, 2018

(65) Prior Publication Data
US 2020/0213150 A1  Jul. 2, 2020

(51) Int. Cl.
| | |
|---|---|
| *H04L 12/44* | (2006.01) |
| *H04L 12/761* | (2013.01) |
| *H04L 12/753* | (2013.01) |
| *H04L 12/947* | (2013.01) |

(52) U.S. Cl.
CPC .............. *H04L 12/44* (2013.01); *H04L 45/16* (2013.01); *H04L 45/48* (2013.01); *H04L 49/252* (2013.01); *H04L 2012/445* (2013.01)

(58) Field of Classification Search
CPC .......... H04L 12/44; H04L 45/16; H04L 45/48
USPC ......................................................... 370/408
See application file for complete search history.

(56) References Cited

U.S. PATENT DOCUMENTS

| | | | |
|---|---|---|---|
| 2010/0254703 A1 | 10/2010 | Kirkpatrick et al. | |
| 2011/0037323 A1* | 2/2011 | Buerer ............... | G05B 19/0423 307/113 |
| 2013/0058215 A1* | 3/2013 | Koponen ............. | H04L 47/783 370/241 |
| 2013/0103817 A1* | 4/2013 | Koponen ............ | G06F 9/45558 709/223 |
| 2013/0223454 A1* | 8/2013 | Dunbar ................... | H04L 45/44 370/400 |
| 2014/0233422 A1* | 8/2014 | Thubert .................. | H04L 45/16 370/254 |
| 2014/0376373 A1 | 12/2014 | Deshpande et al. | |
| 2015/0124642 A1 | 5/2015 | Pani | |
| 2015/0124826 A1 | 5/2015 | Edsall et al. | |
| 2015/0188808 A1 | 7/2015 | Ghawani et al. | |

(Continued)

FOREIGN PATENT DOCUMENTS

EP   2748992 A2   7/2014

*Primary Examiner* — Peter G Solinsky
(74) *Attorney, Agent, or Firm* — Treyz Law Group, P.C.; Tianyi He

(57) ABSTRACT

A packet forwarding network may include spine and leaf switches that forward network traffic between end hosts that are coupled to the packet forwarding network. A controller may control the switches in the forwarding network to implement desired forwarding paths. The packet forwarding network may additionally include access switches that are directly connected to edge switches to form access switch groups. The access switches may also be controlled by the controller. End hosts may be coupled to access switches as well as leaf switches to extend the reach of the packet forwarding network. Additionally, the access switches may include access-leaf switches and access-edge switches to improve network routing capabilities and network flexibility.

20 Claims, 16 Drawing Sheets

(56) References Cited

U.S. PATENT DOCUMENTS

| | | | |
|---|---|---|---|
| 2016/0020939 A1* | 1/2016 | Ramasubramanian | ........................ H04L 41/0659 370/217 |
| 2016/0127274 A1* | 5/2016 | Casado | ................... H04L 45/02 370/400 |
| 2016/0234091 A1* | 8/2016 | Emmadi | ............. H04L 41/0806 |
| 2016/0254956 A1* | 9/2016 | Xu | ....................... H04L 41/0809 370/255 |
| 2018/0007455 A1* | 1/2018 | Mehrvar | ............ H04Q 11/0062 |
| 2018/0034769 A1* | 2/2018 | Modi | .................. H04L 61/2514 |

\* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ADDITIONAL PACKET INFORMATION E.G., HEADERS) | ACTION |
|---|---|---|---|---|---|---|---|---|
| * | * | 00:1FAB | * | * | * | * | | SEND TO PORT 3 |
| * | * | * | * | 172.12.3.4 | * | * | ⋮ | SEND TO PORT 4 |
| * | * | * | * | * | * | 80 | | DROP |

| SWITCH | A1 | A2 | A3 | |
|---|---|---|---|---|
| TYPE | ACCESS | ACCESS | ACCESS | |
| ACCESS GROUP | AG1 | AG1 | AG2 | ... |
| MAC | $MAC_1$ | $MAC_2$ | $MAC_3$ | |
| ⋮ | ⋮ | ⋮ | ⋮ | |

| SWITCH | A4 | A5 | A7 | A6 | A8 | A9 |
|---|---|---|---|---|---|---|
| TYPE | ACCESS-LEAF | | | ACCESS-EDGE | | |
| ACCESS GROUP | AG3 | | AG4 | AG3 | AG4 | |
| ⋮ | | | | | | |

FIG. 9B

NETWORKS WITH MULTIPLE TIERS OF SWITCHES

BACKGROUND

This relates to communication networks, and more particularly, to communications networks having network switches that are controlled by a controller.

Packet-based networks such as the Internet and local data networks that are connected to the internet include network switches. Network switches are used in forwarding packets from packet sources to packet destinations. The packets may be sometimes referred to as frames when referring to data forwarded over layer 2 of the Open Systems Interconnection (OSI) model.

It can be difficult or impossible to configure the switches of one vendor using the equipment of another vendor. To address the challenges associated with controlling different types of switch platforms, cross-platform protocols have been developed. These protocols allow centralized control of otherwise incompatible switches.

These network switches are often provided in inflexible network architectures such as in structured rack systems having two tiers of switches. These constrained network architectures may undesirably limit the scope of the network. It may therefore be desirable to provide additional tiers of switches in a network to extend the scope of the network.

SUMMARY

In some embodiments, a controller may control a network that includes a first network portion formed from switches implemented on a plurality of network racks and from an additional switch coupling the switches implemented in the plurality of network racks to each other. The network may further include a second network portion formed from an access switch connected to a given switch (e.g., a leaf switch) in a given network rack in the plurality of network racks. The controller may control the access switch to forward network traffic between the access switch and an end host directly coupled to a port of the access switch. The access switch may be implemented on circuitry separate from the plurality of network racks. The controller may control the access switch to forward the network traffic between the access switch and an additional end host coupled to the network.

The given switch (e.g., the leaf switch) may be interposed between the access switch and the additional switch, and the additional switch may be interposed between the given switch and a second given switch in a second given network rack in the plurality of network racks. The controller may control the given switch implemented on the given network rack to forward the network traffic between the given switch and the access switch. The controller may control the additional switch to forward the network traffic between the given switch and the additional end host. The additional end host may be coupled to the first network portion. The controller may control the second given switch implemented on the second given network rack to forward the network traffic between the additional switch and the additional end host through the second given switch.

The second network portion may further include an additional access switch interposed between the access switch and the given switch. The controller may control the additional access switch to forward the network traffic between the access switch and the given switch.

In some embodiments, a controller may control switches in a packet forwarding network including first and second edge switches (sometimes referred to herein as leaf switches), a core switch (sometimes referred to herein as a spine switch) coupling the first edge switch to the second edge switch, and an access switch group (e.g., a group of access switches) coupled to the first and second edge switches. The controller may identify a path between an access switch in the access switch group and the first edge switch and may identify an end host that is connected to the core switch through the first access switch, the path, and the first edge switch.

The controller may configure the core switch with a first setting associated with a first switch type, may configure the first and second edge switches with a second setting associated with a second switch type that is different from the first switch type, may configure the access switch with a third setting associated with a third switch type that is different from the first and second switch types. Switches of the first switch type may be only coupled to other switches and switches of the second and third types may be coupled to end hosts and other switches.

The controller may identify a second path between an additional access switch in the access switch group and the access switch and may identify a third path between the additional access switch and a third edge switch. The first and third edge switches may be implemented as top-of-rack switches in a rack-based system.

The controller may identify an additional access switch group that is indirectly connected to the access switch group through the first edge switch.

In some embodiments, computing equipment such as controller circuitry may control switches in a network having end hosts that are coupled to ports of the switches. The computing equipment may identify a first layer of switches, a second layer of switches coupled to each other by switches in the first layer of switches, a third layer of switches, a first end host coupled to the switches in the second layer of switches, and a second host coupled to switches in the third layer of switches. Switches in the second layer of switches may be interposed between the switches in the first layer of switches and the switches in the third layer.

The second layer of switches may be implemented on a plurality of network racks. The third layer of switches may be implemented on switching circuitry separate from the plurality of network racks. The computing equipment may identify the third layer of switches by identifying switches of a first type in the third layer of switches that are directly connected to the switches in the second layer of switches and by identifying switches of a second type in the third layer of switches that are indirectly connected to the switches in the second layer of switches by the switches of the first type. The switches in the first layer of switches may be not directly connected to end hosts.

Further features of the present invention, its nature and various advantages will be more apparent from the accompanying drawings and the following detailed description.

BRIEF DESCRIPTION OF THE DRAWINGS

FIG. 4 is a diagram of an illustrative flow table of the type that may be used by a packet processing system showing three illustrative types of packet forwarding that may be performed based on the flow table entries of the flow table in accordance with some embodiments.

FIGS. 9A and 9B are diagrams of switch configuration data for access switches in accordance with some embodiments.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller such as a controller server or distributed controller server may interact with each of the control clients over respective network links. The use of a cross-platform controller and corresponding controller clients allows potentially disparate network switch equipment to be centrally managed.

Figure 1:
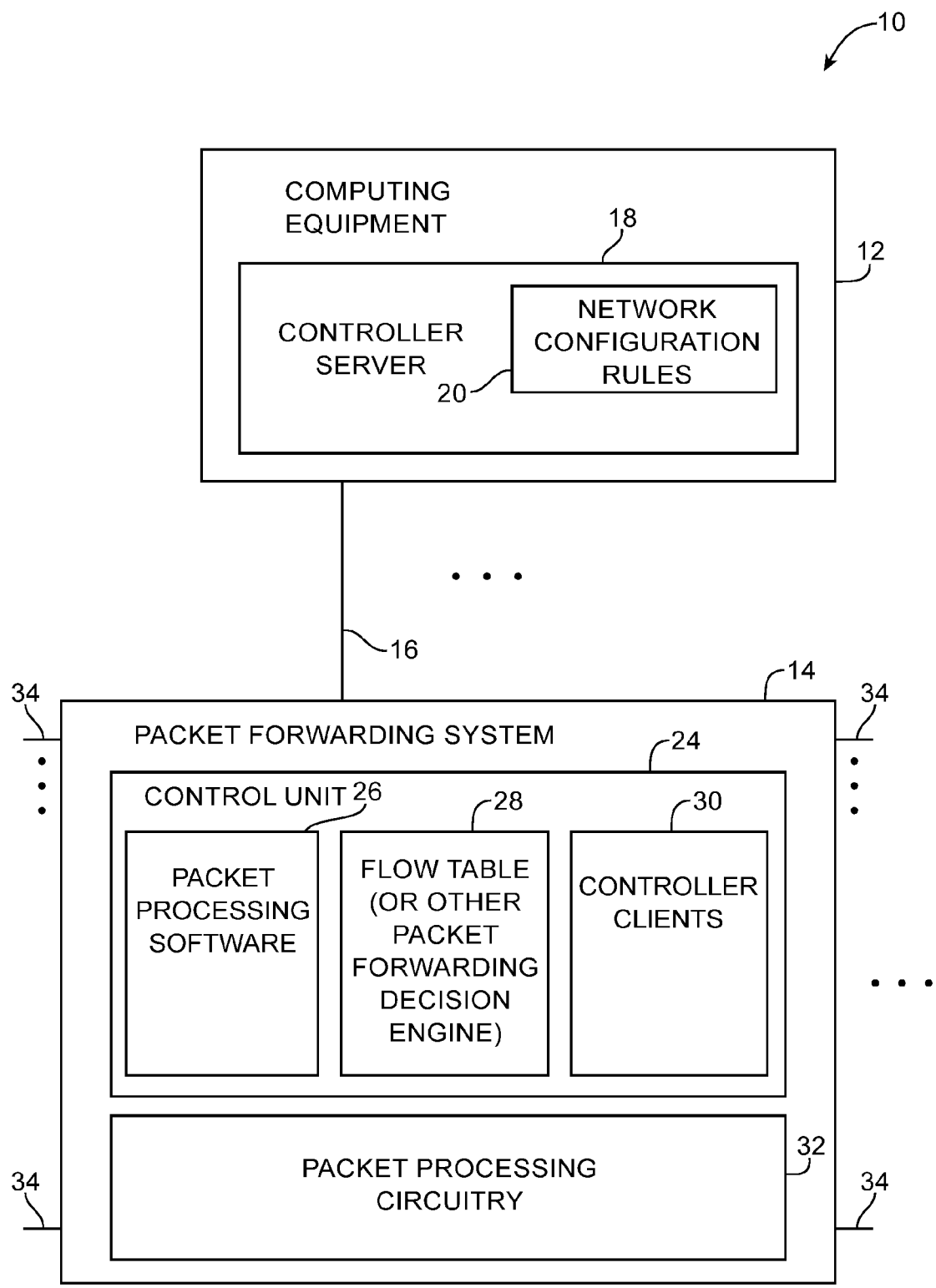
FIG. 1 is a diagram of an illustrative network that includes a controller and a packet forwarding system in accordance with some embodiments.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data (e.g., configuration data) to the hardware in network 10 (e.g., switch hardware) to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20 (e.g., network policy information, user input information). Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (e.g., each packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0, 1.3.1, or other versions of the OpenFlow protocol). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As an example, packet forwarding decision engines may direct packet forwarding system 14 to forward network packets to predetermined ports based on attributes of the network packets (e.g., based on network protocol headers).

Any desired switch may be provided with controller clients that communicate with and are controlled by a controller server. For example, switch 14 may be implemented using a general-purpose processing platform that runs control software and that omits packet processing circuitry 32. As another example, switch 14 may be implemented using control circuitry that is coupled to one or more high-speed switching integrated circuits ("switch ICs"). As yet another example, switch 14 may be implemented as a line card in a rack-based system having multiple line cards each with its own packet processing circuitry. The controller server may, if desired, be implemented on one or more line cards in the rack-based system, in another rack-based system, or on other computing equipment that is coupled to the network.

Figure 2:
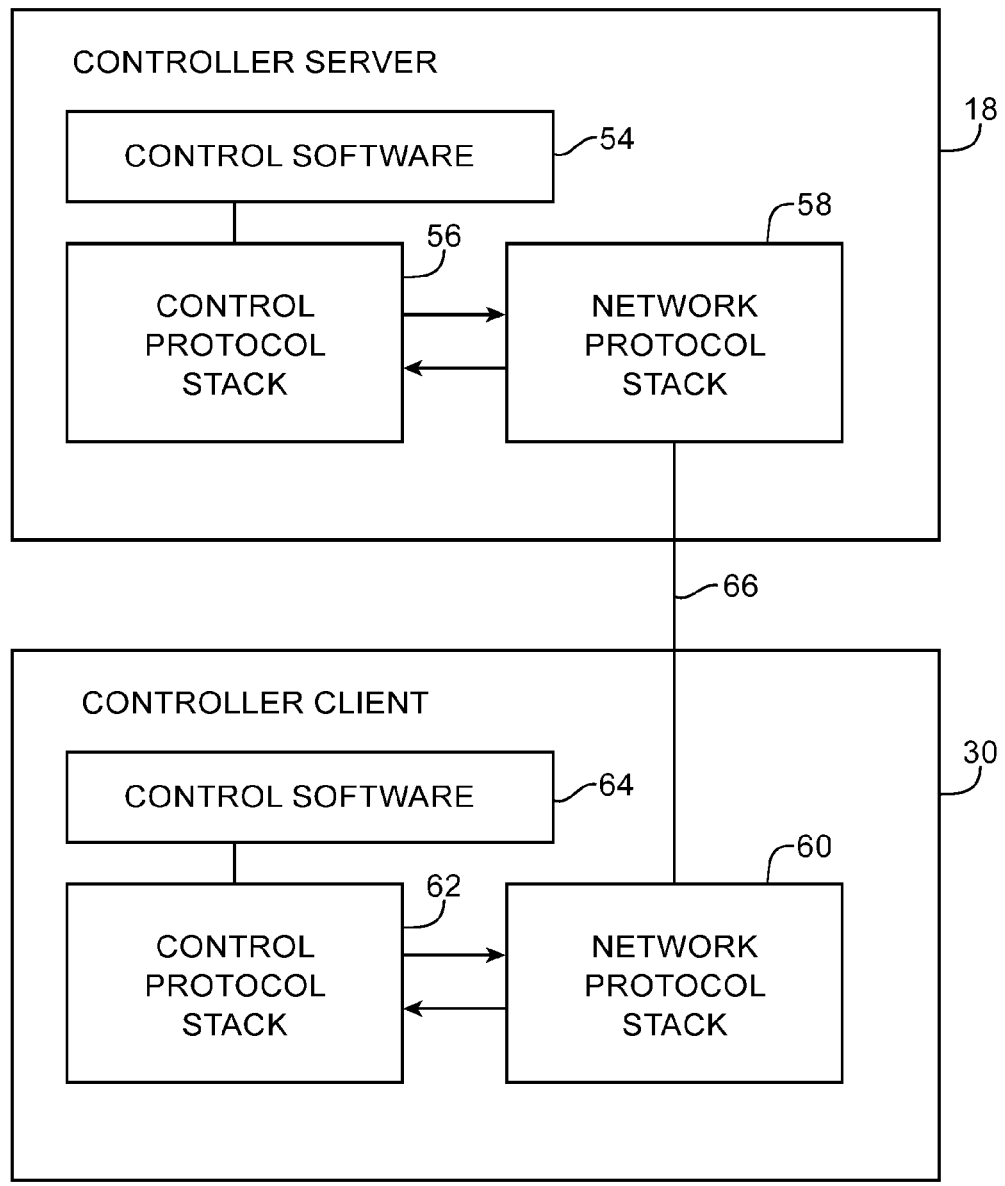
FIG. 2 is a diagram of a controller server and controller client that may communicate over a network connection in accordance with some embodiments.

As shown in FIG. 2, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a backbone path in a rack-based system. Arrangements in which path 66 is a network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stack 56 generates and parses control protocol messages (e.g., control messages to activate a port or to install a particular flow table entry into flow table 28). By using arrangements of the type shown in FIG. 2, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 3:
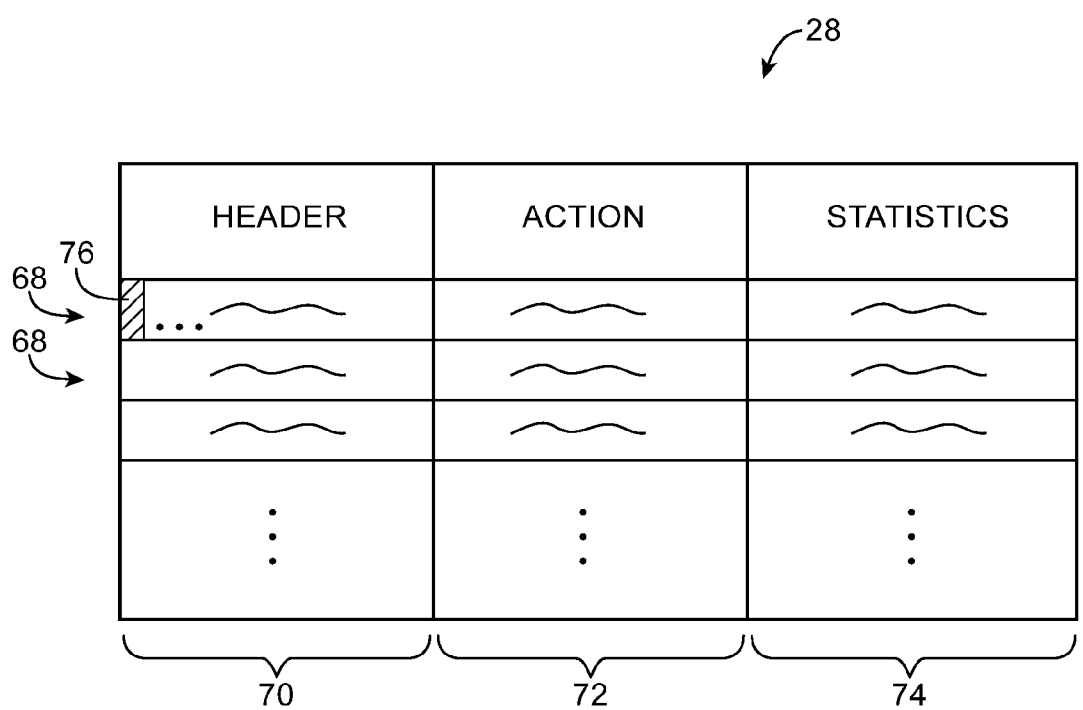
FIG. 3 is a diagram of an illustrative flow table of the type that may be used by a packet processing system in accordance with some embodiments.

An illustrative flow table is shown in FIG. 3. As shown in FIG. 3, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port. The modify-field actions may be used in rewriting portions of network packets that match the flow table entry.

FIG. 4 is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet. Additional fields may match additional packet information (e.g., packet header information of network packets).

The entry of the first row of the FIG. 4 table directs the switch in which the flow table entry is operating to perform Ethernet switching. In particular, incoming packets with matching Ethernet destination addresses are forwarded to port 3.

The entry of the second row of table of FIG. 4 illustrates how a switch may be configured to perform internet routing (i.e., packets are forwarded based on their destination IP address).

The third row of the table of FIG. 4 contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 4 may be loaded into a switch 14 by controller server 18 during system setup operations or may be provided to a switch 14 from controller server 18 in real time in response to receipt and processing of packets at controller server 18 from switches such as switch 14. In a network with numerous switches 14, each switch can be provided with appropriate flow table entries to form a path through the network.

Figure 5:
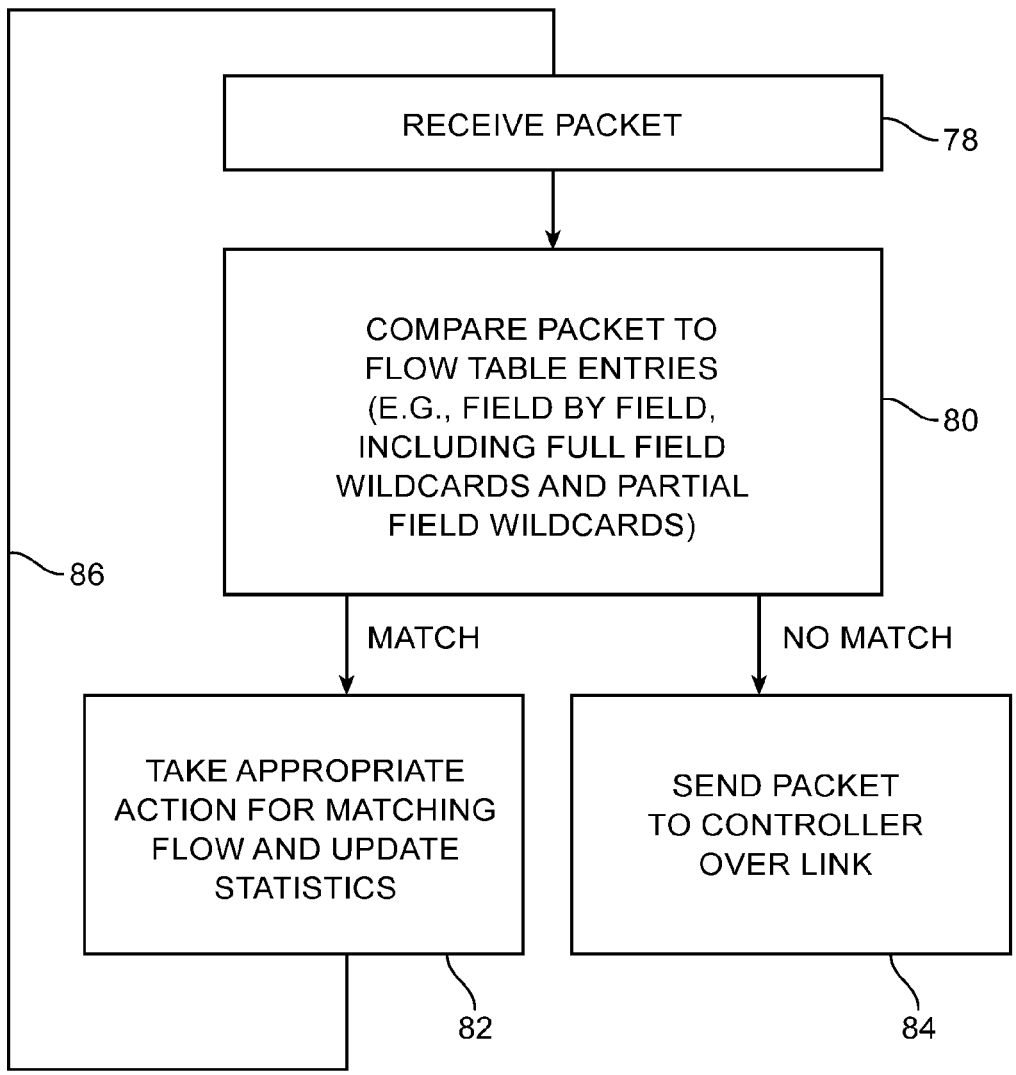
FIG. 5 is a flow chart of illustrative steps involved in processing packets in a packet processing system in accordance with some embodiments.

Illustrative steps that may be performed by switch 14 in processing packets that are received on input-output ports 34 are shown in FIG. 5. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (e.g., complete addresses). Other fields may contain wildcards (i.e., fields marked with the "don't care" wildcard character of "*"). Yet other fields may have partially complete entries (e.g., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 6:
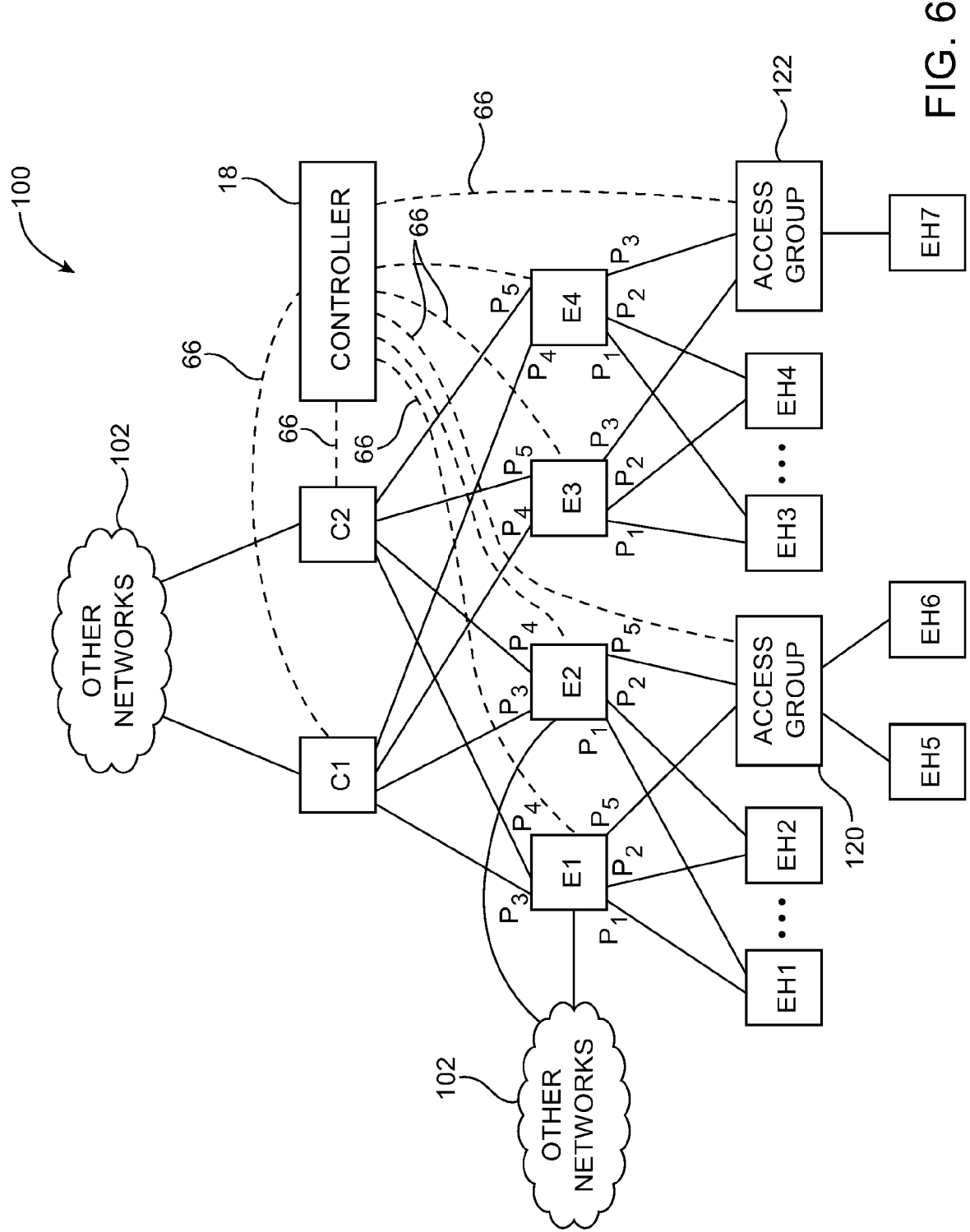
FIG. 6 is a diagram of an illustrative network having different layers or tiers of switches that may be controlled by a controller in accordance with some embodiments.

FIG. 6 is a diagram of an illustrative network 100 in which switches may be controlled by a controller 18. Controller 18 may be a controller server or a distributed controller implemented across multiple computing equipment. As shown in FIG. 6, network 100 may include switches C1, C2, E1, E2, E3, and E4. Controller 18 may be coupled to the switches of network 100 via control paths 66. Controller 18 may control the switches using control paths 66 (e.g., by providing flow table entries such as flow table entries 68 of FIG. 3).

Network 100 may include end hosts such as end hosts EH1, EH2, EH3, and EH4 that are coupled to the switches of network 100 (e.g., switches E1, E2, E3, and E4). Switches that are directly coupled to end hosts may sometimes be referred to as edge switches or be referred to as leaf switches, whereas switches that merely interconnect other switches and are not directly coupled to the end hosts may be referred to as core switches or be referred to as spine switches. In the example of FIG. 6, switches E1, E2, E3, and E4 are edge switches, because they are coupled to end hosts. Switches C1 and C2 are core switches, because switches C1 and C2 interconnect switches E1, E2, E3, and E4 and are not directly coupled to end hosts. Core switches such as switches C1 and C2 may couple network 100 to other networks 102 (e.g., other networks including switches and end hosts). If desired, other networks 102 may be coupled to edges switches such as edge switches E1 and E2 in addition to or instead of core switches C1 and C2. The example of FIG. 6 in which edge switches are directly connected to core switches are merely illustrative. If desired, additional core switches may be interposed between the edge and core switches in FIG. 6.

Core switches such as switches C1 and C2 may be referred to as a first tier or layer of (physical) switches in network 100, and edge switches such as switches E1, E2, E3, and E4 may be referred to as a second tier or layer of (physical) switches in network 100. In some scenarios, these two-tiered networks may be inefficient in providing all of the desirable network connections. Take as an example in the case of a rack-based system having edge switches coupled to end hosts in a particular rack, end host connections to the edge switches are physically limited to connections within the particular rack. This and other physical network constraints limit the connectivity of the edge switches and consequently the connectivity of the network controlled by a centralized controller.

To improve the connectivity of the network, a network such as network 100 may include an additional layer of (physical) switches (e.g., access switches arranged in access switch groups) in addition to the layer of core switches and the layer of edge switches. Still referring to FIG. 6, controller 18 may be coupled to access switches in access switch groups 120 and 122 (sometimes referred to herein as access groups) via control paths 66. In other words, controller 18 may control access switches in access groups in a similar manner as described in connection with core and edge switches. Access groups may be directly connected to edge switches, but not to core switches. End hosts may be directly coupled to edge switches as well as access switches, but not core switches. Put another way, controller 18 may discover and route traffic from any end host coupled to the edge switches and access switches.

In the example of FIG. 6, access group 120 may be directly connected to edge switches E1 and E2, while access group 122 may be directly connected to edge switches E3 and E4. Access group 120 may also be coupled to end hosts EH5 and EH6, and access group 122 may be coupled to end host EH7. By providing access switches as a third tier of switches, edge switches may be coupled to an additional set of end hosts that otherwise could not be coupled to the edge switches. As an example, end host EH5, which may be distant from the circuitry on which edge switches E1 and E2 are implemented such as a network rack, is connected to the network 100 using the intermediate connection of access group 120.

Core switches and edge switches may be formed on a closely integrated and central portion of network 100 such as on network racks in a rack-based system and switching circuitry between different network racks. As a result, these core and edge switches (e.g., switches C1, C2, E1, E2, E3, and E4 in FIG. 6) may be referred to as a main portion of network 100 or the main data fabric. Access groups may provide intermediate connections from the main portion of network 100 to peripheral end hosts such as end host EH5. As a result, access groups in network 100 may be referred to as an intermediate portion of network 100 or the intermediate data fabric. Because controller 18 provides centralized control to core switches, edge switches, and access switches (in access groups), network traffic may be directed from distant end hosts coupled to the intermediate data fabric (e.g., end host EH5) to end hosts coupled to the main data fabric (e.g., end host 1) with relative ease.

Figure 7:
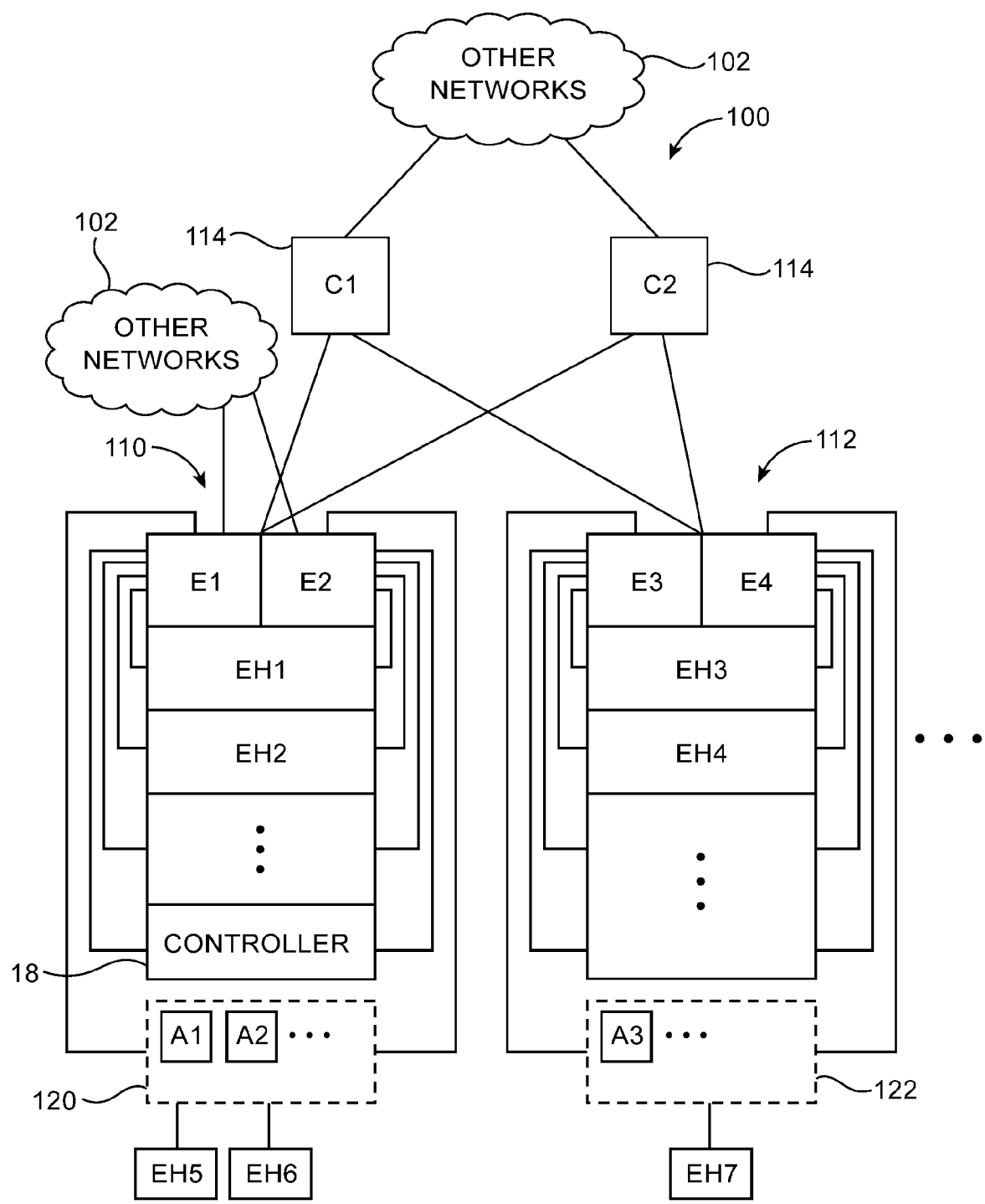
FIG. 7 is a diagram of an illustrative rack-based system that implements a network having different layers or tiers of switches that may be controlled by a controller in accordance with some embodiments.

FIG. 7 is an illustrative example of network 100 of FIG. 6 that is implemented using rack-based systems. As shown in FIG. 7, edge switches and end hosts may be implemented using network racks 110 and 112 that are coupled to switches 114 (e.g., core switches as shown in FIG. 7). If desired, network 100 may include additional network racks that house additional end hosts and switches and are coupled to switches 114. Network rack 110 may include edge switches E1 and E2 and end hosts EH1 and EH2, whereas network rack 112 may include edge switches E3 and E4 and end hosts EH3 and EH4. Edge switches E1, E2, E3, and E4 may serve as top-of-rack switches that are coupled via network paths to each end host of the corresponding network rack 112. For example, top-of-rack switch E3 is connected to each of the end hosts of network 112 (e.g., end hosts EH3 and EH4).

Each top-of-rack switch serves as an interface between end hosts of the corresponding network rack and other network devices such as other portions of network 100 or other networks 102 (coupled to edges switches E1 and E2 and/or coupled to core switches C1 and C2). Network traffic to or from end hosts of network rack 110 may be required to traverse at least one of the top-of-rack switches of network rack 110 (e.g., top-of-rack switches E1 and E2). Similarly, network traffic of network rack 112 may be required to traverse at least one of switches E3 and E4. As an example, network packets sent by end host EH1 to end host EH3 may be forwarded by top-of-rack switch E1, core switch C1, and top-of-rack switch E3. As another example, network packets sent by end host EH1 to end host EH3 may be forwarded by top-of-rack switch E2, core switch C1, and top-of-rack switch E4. If desired, network traffic to or from end hosts directly coupled to access groups may be required to traverse at least one of the top-of-rack switches.

If desired, switches may be implemented using computing equipment of network racks 110 and 112. As an example, a software switch may be implemented using computing equipment such as a line card of network rack 110. The software switch may sometimes be referred to as a hypervisor switch. Hypervisor switches may be implemented using dedicated circuitry or using software on discrete computing equipment (e.g., on a line card). However, such software switches are coupled to the rest of the network by cables plugged into dedicated physical ports of the computing equipment on which the software switch is implemented.

The software switch may interface with end hosts in the corresponding rack (e.g., in the same rack in which the software switch is formed). In other words, shared computing equipment may be used to implement the software switch and the end hosts with which the software switch is interfaced. If desired, multiple end hosts may be implemented in software on the shared computing equipment. For example, tens, hundreds, thousands, or more end hosts may be implemented on the shared computing equipment and logically coupled in software to logical ports of the software switch, whereas the software switch is connected to network 100 by physical ports of the shared computing equipment on which the software switch itself is implemented.

As shown in FIG. 7, controller 18 may be implemented in network rack 110 (e.g., using the resources of a line card or other computing equipment of network rack 110). Controller 18 may communicate with the top-of-rack switches and core switches by sending control packets and receiving control plane packets from the switches. In this scenario, one or more switches of network 100 may form portions of control paths 66 of FIG. 6. For example, switch E1 or switch E2 may serve as part of control paths between core switches C1 and C2 and controller 18. As another example, switches E1, E2, C1, and C2 may form portions of control paths between controller 18 and switches E3 and E4.

As described in connection with FIG. 6, network 100 may include access groups 120 and 122 shown in the network configuration of FIG. 7. Access group 120 may include access switch A1, access switch A2, and optionally other access switches. Access group 122 may include access switch A3 and optionally other access switches.

These access switches may be implemented on circuitry that is physically separate from the circuitry on which edge switches and core switches are implemented. In the illustrative example of FIG. 7, edge switches E1 and E2 may be implemented using circuitry in network rack 110. Core switches C1 and C2 may be implemented using switching circuitry interposed between different network racks on which different edge switches are implemented. Edge switches E1 and E2 may be coupled to access group 120 having access switches A1 and A2. Access switches A1 and A2 may be implemented on circuitry that is separate from network rack 110. In fact, access switches A1 and A2 may be implemented on switching circuitry that is not rack-based. Access switches such as switches A1 and A2 may be implemented using circuitry and configurations described in connection with switch 14 in FIG. 1. As examples, access switches may be implemented using a general-purpose processing platform that runs control software and that omits packet processing circuitry, may be implemented using control circuitry that is coupled to one or more high-speed switching integrated circuits ("switch ICs"), etc.

In other words, edge switches such as edge switches E1, E2, E3, and E3 may be implemented as an integral portion of network racks such as network racks 110 and 112 in a centralized manner to form a main fabric portion controlled by controller 18. In contrast, access switches such as access switches A1, A2, and A3 may be implemented separately from the centralized network racks and in a distributed manner to form an intermediate fabric portion coupling additional end hosts not implemented using network racks in the main fabric portion to the main fabric portion. To control access switches, controller 18 may form control paths using one or more switches in network 100 to send control packets to one or more access switches in network 100. As an example, switch E1 or switch E2 may serve as part of control paths between access switches A1 and A2 and controller 18.

The network configurations of FIGS. 6 and 7 are merely illustrative. If desired, network 100 may include any number of access groups each having any number of access switches coupled to any number of end hosts. If desired, one or more additional network racks (e.g., other than network racks 110 and 112) may be coupled to additional access groups and additional end hosts outside of the one or more additional network racks.

Access groups such as access groups 120 and 122 in FIGS. 6 and 7 may have access switches arranged in any suitable manner. FIGS. 8A-8D show some illustrative access switch configurations within access groups. These illustrative access switch configurations may all be implemented simultaneously within network 100, if desired. Alternatively, one or more of these illustrative access switch configurations may be omitted from network 100.

Figure 8A:
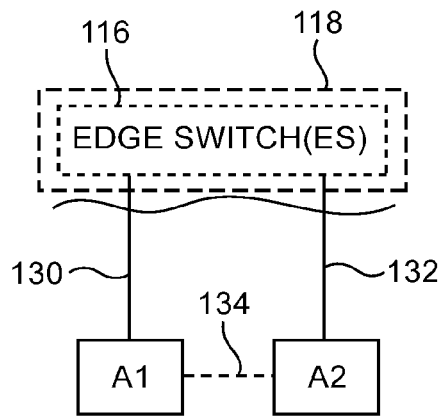
FIGS. 8A-8D are diagrams of illustrative access switch configurations in access switch groups in accordance with some embodiments.

FIG. 8A shows access switches A1 and A2 coupled to one or more edge switches 116 (e.g., edge switches E1 and E2 in FIGS. 6 and 7). In particular, access switch A1 may be coupled to a first edge switch in edge switches 116 (e.g., edge switch E1) via path 130. Access switch A2 may be coupled to a second edge switch in edge switches 116 (e.g., edge switch E2) via path 132. Access switches A1 and A2 may be optionally coupled to each other via path 134. In the example of FIG. 8A, a particular access group may be formed from only two access switches that are both coupled to one or more edge switches. Each of access switches A1 and A2 may be coupled to one or more end hosts, which are connected to main fabric portion 118 in network 100 via the particular access group shown in FIG. 8A having access switches A1 and A2. In other words, access switches may have ports that are directly connected to ports of edge switches and may have other ports that are directly connected to end hosts.

If desired, each access group (e.g., the access group including access switches A1 and A2) may be connected to a pair of leaf switches (in a network rack). If desired, each access group may be connected to a pair of leaf switches by multiple links (e.g., by three separate physical links), a subset of which are used to provide routing (e.g., two out of three links are used).

Figure 8B:
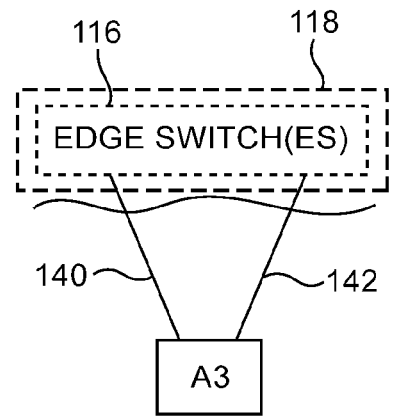

FIG. 8B shows access switch A3 coupled to one or more edge switches 116 (e.g., edge switches E3 and E4 in FIGS. 6 and 7). In particular, access switch A3 may be coupled to a first edge switch in edge switches 116 (e.g., edge switch E3) via path 140 and to a second edge switch in edge switches 116 (e.g., edge switch E4) via path 142. In the example of FIG. 8B, a particular access group may be formed from only a single access switch that is coupled to one or more edge switches. Access switch A3 may be coupled to one or more end hosts, which are connected to main fabric portion 118 in network 100 via the particular access group shown in FIG. 8B having access switch A3.

FIGS. 8A and 8B show illustrative access group configurations having only one type of access switches (e.g., access switches coupled directly to edge switches). This is merely illustrative. If desired, access group configurations may include both access switches coupled directly to edge switches, and access switches coupled to edge switches through intervening access switches.

Figure 8C:
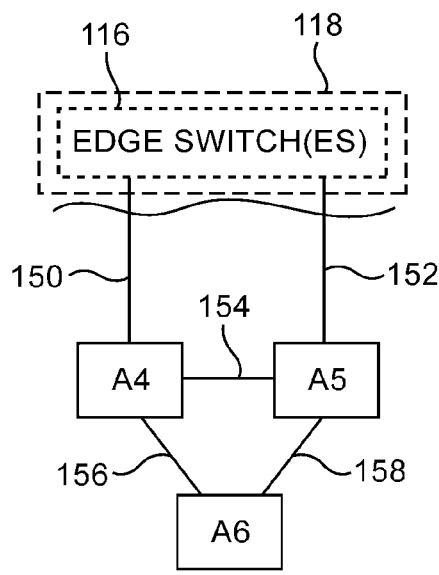

FIG. 8C shows access switches A4 and A5 coupled to one or more edge switches 116 and to each other via paths 150, 152, and 154 (in a similar manner as shown in FIG. 8A). Additionally, the access group in FIG. 8C may further include access switch A6. Access switch A6 may be coupled to access switch A4 via path 156 and to access switch A5 via path 158.

In the example of FIG. 8C, there are two types of functionally different access switches. The first type of type of access switches are sometimes referred to herein as access-leaf switches (e.g., access switches A4 and A5) that are directly connected to edge or leaf switches. The second type of access switches are sometimes referred to herein as access-edge switches (e.g., access switch A6) that are only indirectly connected (via other access switches) to edge or leaf switches. In other words, access-leaf switches may directly connect end hosts, other access-leaf switches, and access-edge switches to edge switches, whereas access-edge switches may directly connect end hosts to access-leaf switches. Both types of access switches may be coupled to one or more end hosts. These end hosts may be connected to main fabric portion 118 in network 100 via a particular access group such as the access group shown in FIG. 8C.

Figure 8D:
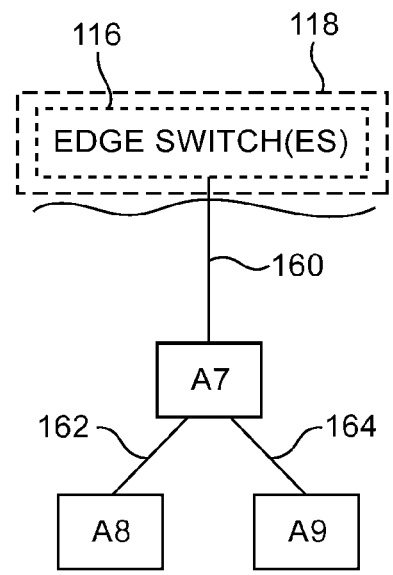

FIG. 8D shows access-leaf switch A7 coupled to one or more edge switches 116 via path 160. Additionally, the access group in FIG. 8D may further include access-edge switches A8 and A9. Access-edge switches A8 and A9 may be coupled to access-leaf switch A7 via paths 162 and 164, respectively. Each of access switches A7, A8, and A9 may also be coupled to any number of end hosts.

The access group configuration examples in FIGS. 8A-8D are merely illustrative. If desired, any number of different types of access switches may be included in an access group. As an example, an access group may include a first set of access-edge switches and a second set of access-leaf switches interposed between the first set of access-edge switches and a third set of edge switches. By providing a multitude of access switches having different functionalities, an access group may have enhanced local routing capabilities (e.g., between end hosts directly connected to the access group).

While each access switch is depicted in the examples of FIGS. 8A-8D as being connected to another switch by a single link, this is merely illustrative. If desired, two or more links may connect each access switch from another switch for fault tolerance. Additionally, if desired, the two or more links may form a link aggregation group.

If desired, each of the access switch configurations in FIGS. 8A-8D may represent a distinct access group in network 100. In other words, a first network rack in network 100 may be coupled to the access group shown in FIG. 8A, whereas a second network rack in network 100 may be coupled to the access group shown in FIG. 8B that is implemented separately from the access group shown in FIG. 8A. Similarly, third and fourth network racks in network 100 may be coupled to the access groups shown in FIGS. 8C and 8D, respectively.

If desired, in addition to being used for network packet routing, access switches and paths coupling access switches to edge switches in main fabric portion 118 may form portions of control paths 66 of FIG. 6. As an example, access switch A7 and edge switches 116 may serve as part of control paths between access switches A8 and A9 and controller 18. As another example, access switches A1 and edge switches 116 may form portions of control paths between controller 18 and access switch A2. If desired, direct control paths may be formed from controller 18 directly to one or more access switches (e.g., without intervening edge switches and/or intervening access switches).

Controller 18 may configure access switches using configuration information and/or network policy information for access switches. FIGS. 9A and 9B show illustrative (access) switch configuration information. In FIG. 9A, table 170 shows a list of illustrative properties or attributes that controller 18 may use to identify and configure (access) switches. In particular, controller 18 may assign a switch type to each (access) switch and identify the switches with the location and/or functions of the switch type. As an example, controller 18 may assign access switches A1, A2, and A3 as type 'access' (in relation to the access group configuration of FIG. 8A). As another example, controller may assign type 'edge' or 'leaf' to edge switches 116 in FIGS. 8A-8D in contrast with the function and relative location of access switches in the network. As yet another example, controller 18 may assign type 'core' or 'spine' to core switches C1 and C2 in FIGS. 6 and 7 in contrast with the function and relative location of edge switches and access switches in the network. The specific words associated with each type (e.g., "access", "edge", "leaf", etc.) is used in an illustrative manner. More importantly, controller 18 may identify and use the functions and the locations associated with each type of switch in the network to properly control and manage each of the switches.

Still referring to FIG. 9A, controller 18 may also identify and associate each access switch with an access group. As examples, access switches A1 and A2 may form at least a portion of access group AG1, and access switch A3 may form at least a portion of access group AG2. By identifying each access group and the corresponding access switches in each access group, controller 18 may implement network policy specific to each access group separately by sending individualized control packets to each access group (e.g., all the switches in each access group).

If desired, controller 18 may also configure access switches by providing the access switches with other information such as identification information (e.g., MAC addresses), routing information, network policy and topology information for various portion of a network (e.g., for the entire network, for a main fabric portion of the network, for an intermediate fabric portion of the network, for specific access groups in the network, for specific access switches in a particular access group in the network, etc.).

FIG. 9B shows illustrative configuration information for access switches that are of different types (as described in connection with FIGS. 8C and 8D). In particular, table 172 shows a list of illustrative properties or attributes that controller 18 may use to identify and configure (access) switches of different types. Instead of identifying access switches with type 'access', controller 18 may use information in table 172, to identify different types of access switches. In the examples of FIG. 9B, controller 18 may identify switches A4 and A5 (in relation to the access group configuration of FIG. 8C) as type 'access-leaf' and switch A7 (in relation to the access group configuration of FIG. 8D) as type 'access-leaf'. Controller 18 may also identify switches A6 (in relation to the access group configuration of FIG. 8C) as type 'access-edge' and switches A8 and A9 (in relation to the access group configuration of FIG. 8D) as type 'access-edge'.

Each of access switches A4, A5, A6, A7, A8, and A9 may identify with a single access group. As examples, access-leaf switches A4 and A5 and access-edge switch A6 may form at least a portion of access group AG3, whereas access-leaf switch A7 and access-edge switches A8 and A9 may form at least a portion of access group AG4.

The information as described in connection with FIGS. 9A and 9B are merely illustrative. If desired, other attributes may be used instead of or in addition to those described in connection with FIGS. 9A and 9B to identify the function and/or location of access switches in access groups within a network. As an example, controller 18 may distinguish between more than two types of access switches using a third access switch type. As another example, controller 18 may implement a network policy that ensures one or more access switches not be connected directly to end hosts (e.g., different from access-leaf switches and different from access-edge switches as described in connection with FIGS. 8C and 8D). If desired, controller may use different sets of configuration or network policy information for different access groups within a network. As an example, network 100 may have a first access group having access switches that are all defined as type 'access' and also a second access group having access switches that are distinguished between types 'access-leaf' and 'access-edge'.

Based on (access) switch configuration information, (access group) network policy information, and/or other information (e.g., network topology information, user input information), controller 18 may perform network configuration operations (as described in FIG. 1) for the intermediate data fabric in network 100 in addition to the main data fabric in network 100. In particular, controller 18 configure access switches, access groups, and the intermediate data fabric in network 100 at any suitable time as described in connection with FIG. 1.

Figure 10:
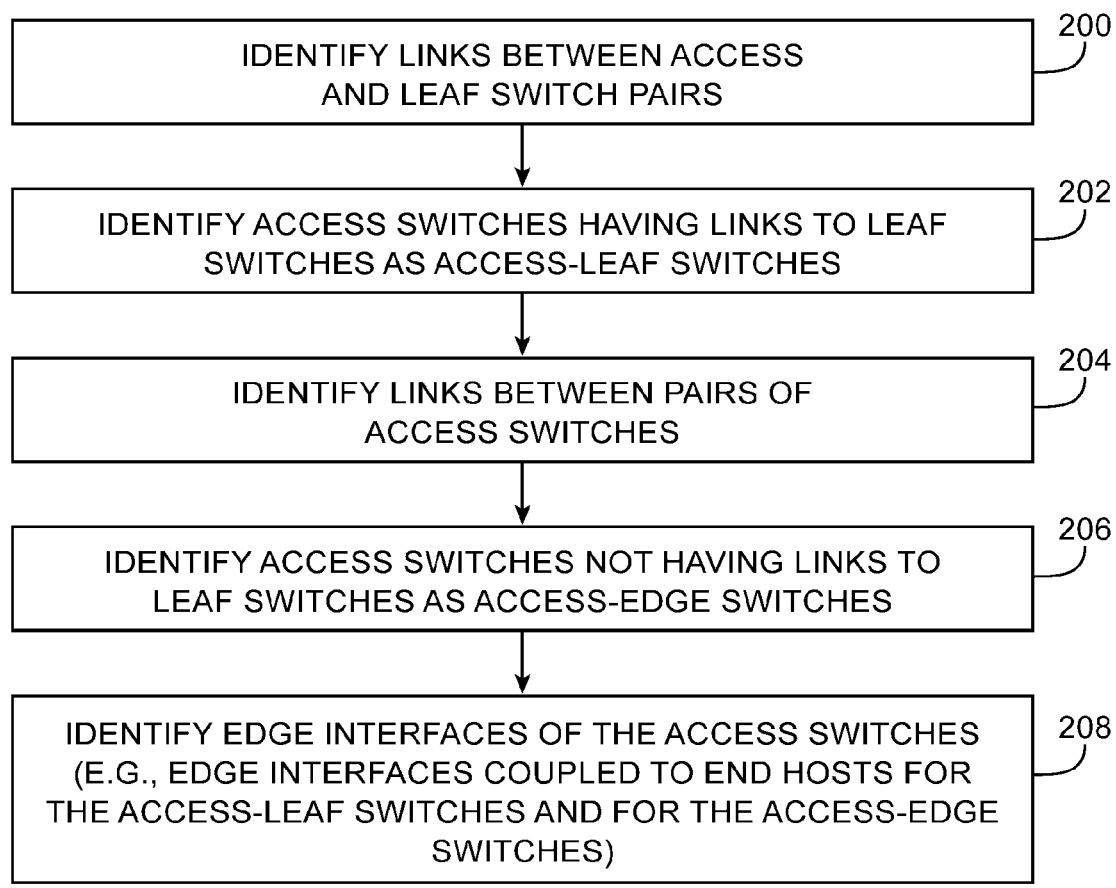
FIG. 10 is a flowchart of illustrative steps for performing link discovery and switch identification in access switch groups in accordance with some embodiments.

To generate network topology information and implement or enforce network policy information and to configure switches using the proper switch configuration information, controller 18 may perform link discovery operations (e.g., using LLDP probe packets) particularly for the intermediate fabric portion of network 100. FIG. 10 shows a flowchart of illustrative steps for discovering or identifying the network topology within the intermediate fabric portion of network 100.

At step 200, controller 18 may identify (e.g., using information gathered by probe packets) links between access and leaf (or edge) switch pairs referred to herein sometimes as access-leaf links. As examples, controller 18 may identify links 130 and 132 in FIG. 8A, links 140 and 142 in FIG. 8B, links 150 and 152 in FIG. 8C, and link 160 in FIG. 8D. Additionally, controller 18 may identify the port of a leaf switch connected to an access switch as an 'access' type port of a leaf switch and may identify the port of an access switch connected to a leaf switch as a 'leaf' type port of an access switch.

At step 202, controller 18 may identify access switches having links to leaf switches as access-leaf switches. As an example, controller 18 may determine that access switches A4 and A5 in FIG. 8C have respective links 150 and 152 that connect access switches A4 and A5 directly to one or more edge switches 116 and identify access switches A4 and A5 as access-leaf switches. As another example, controller may optionally determine that access switch A3 in FIG. 8B has at least one link that connects switch A3 directly to one or more edge switches 116 and identify access switch A3 as an access switch. Alternatively, controller 18 may identify switch A3 generally as an access switch (e.g., in response to determining that no access-edge switches in the same access group).

At step 204, controller 18 may identify links between pairs of access switches (e.g., between peer access switches of the same type, between access switches of different types, etc.). As examples, controller 18 may identify link 134 between peer access switches A1 and A2 in FIG. 8A and link 154 between peer access-leaf switches A4 and A5 in FIG. 8C. As further examples, controller 18 may identify links 156 and 158 between access-leaf and access-edge switches in FIG. 8C and links 162 and 164 between access-leaf and access-edge switches in FIG. 8D. Additionally, controller 18 may identify the port of an access switch connected to another access switch as an 'access' type port of an access switch.

At step 206, controller 18 may identify access switches not having (direct) links to leaf switches as access-edge switches. As an example, controller 18 may determine that access switch A6 in FIG. 8C does not have a direct link to a leaf switch (e.g., only has direct links to other access switches and edge hosts) and identify access switch A6 as an access-edge switch. As further examples, controller 18 may determine that access switches A8 and A9 in FIG. 8D do not have direct links to leaf switches and identify access switches A8 and A9 as access-edge switches.

At step 208, controller 18 may identify edge interfaces of the access switches. In particular, controller 18 may identify edge interfaces (e.g., ports) of access switches coupled to end hosts for both access-leaf switches and access-edge switches. In other words, controller 18 may identify edge interfaces of access groups coupled to end hosts for the access groups. As examples, controller 18 may identify edge interfaces of access group 120 coupled to end hosts EH5 and EH6 and edge interfaces of access group 122 coupled to end host EH7 in FIG. 7. As further examples, controller 18 may identify any end hosts directly connected to ports of access switches A1, A2, A3, A4, A5, A6, A7, A8, and A9 in FIGS. 8A-8D.

By performing or processing the steps of FIG. 10, controller 18 may identify the topology of the intermediate fabric portion of network 110. Prior to, concurrently with, and/or after, performing link discovery for the intermediate fabric portion of network 100 (the steps of FIG. 10), controller 18 may perform a similar link discovery operation for the main fabric portion of network 100 (e.g., to discover links between core and edge switch pairs, to discover edge interfaces of edge switches, to identify switches as edge switches or core switches, etc.).

Additionally, any links and/or portions discovered by the steps of FIG. 10 but do not comply with network policy may be removed or shut down. Examples of network policies that may be enforced are that there by only two access-leaf switches in each access group, that each access-edge switch may not be coupled to another access-edge switch, that both the links are coupled to access-leaf switches if an end host is coupled to an access group via two links, etc.

The steps and order of steps in FIG. 10 are merely illustrative. If desired, steps in FIG. 10 may be omitted and/or replaced with a different step. As an example, controller 18 may already have identified switches in an access group and the types of the identified switches and may therefore perform steps 200, 204, and 208 (omitting steps 202 and 206) to identify links between the identified switches. As another example, step 208 may be performed without steps 200, 202, 204, and 206, during an update that only adds and/or removes end hosts. Additionally, the order steps in FIG. 10 may switched. As an example, controller 18 may process, steps 200, 204, and 208, before processing steps 202 and 206 to properly identify the type of each access switch.

If desired, controller 18 may receive specific configuration information regarding interfaces that are connected to leaf and access switches to process steps 200, 202, 204, 206, and/or 208. If desired, each switch may include pre-designated interfaces, which can only be used for internal links. Controller 18 may identify these pre-designated interfaces when processing steps 200, 202, 204, 206, and/or 208.

After controller 18 has identified the network topology of network 100 (e.g., the topology of intermediate fabric portion of network 100, the links between the intermediate fabric portion and the main fabric portion, the types of access switches in each access group, how the access switches are connected to each other, etc.), controller 18 may provide control packets to access groups and/or separate access switches to implement network policy and more specifically to implement access group policy. Access group policy may include rules regarding the number of types of access switches (e.g., the depth or number of layers of different access switches in an access group), regarding how access switches are connected with one another (e.g., whether there are peer access switch links, what is the maximum or minimum number of links between switches), regarding connectivity to end hosts, regarding connectivity to the main fabric portion of network 100 (e.g., whether and how local traffic within an access group is to be forwarded to the main fabric portion of network 100), regarding connectivity between different access groups (e.g., whether different access groups are permitted to route traffic to one another), etc.

Figure 11:
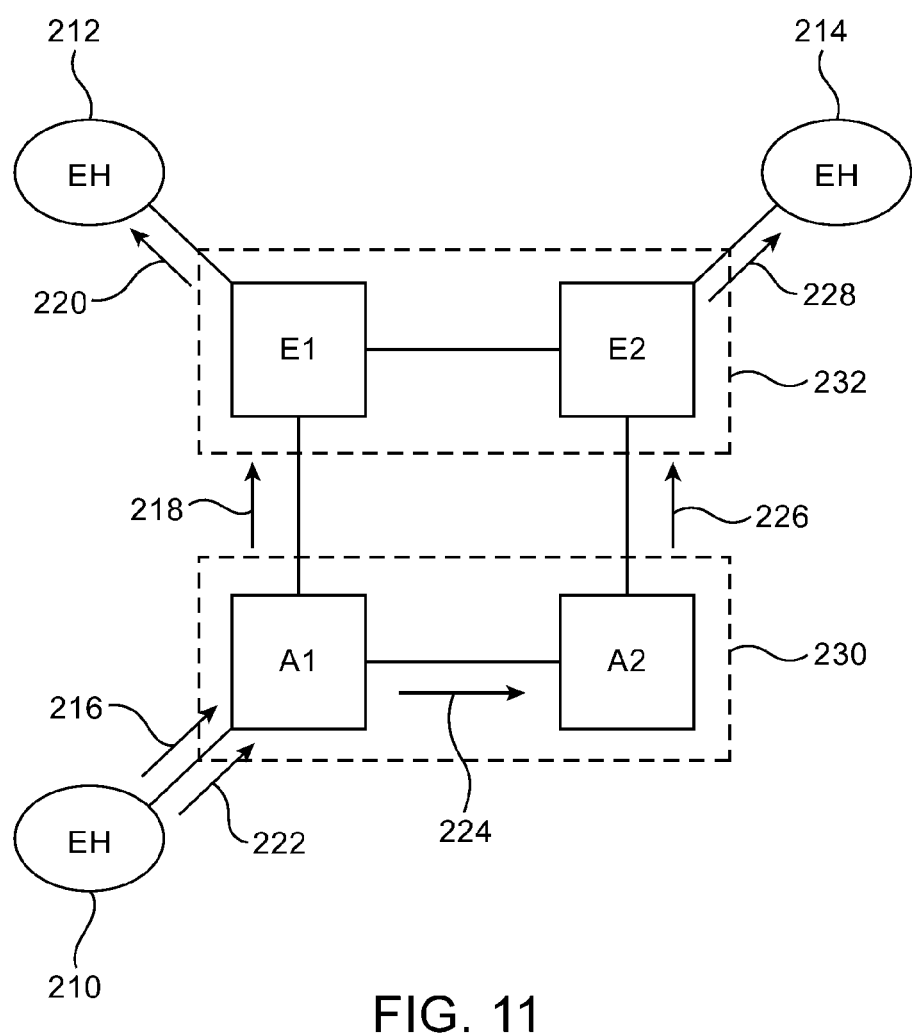
FIG. 11 is a diagram of illustrative packet routing schemes in a network having access switch groups in accordance with some embodiments.

Based on the network policy and the network topology, controller 18 may provide flow tables (e.g., in FIG. 3) or other settings to access switches in addition to leaf switches and spine switches. Configured with these settings, access switches in the intermediate fabric portion may route network traffic throughout network 100 (regardless of the portion of network 100) with relative ease. FIG. 11 shows illustrative paths for routing network traffic through network 100 between the main fabric portion and the intermediate fabric portion of network 100 (e.g., the access group in FIG. 8A).

As shown in FIG. 11, access switch A1 may be connected to end host 210 at a first port, access switch A2 at a second port, and edge switch E1 at a third port. Access switch A1 may be connected to access switch A1 at a first port and edge switch E2 at a second port. Access switches A1 and A2 may form at least a portion of an access group that forms at least a portion of intermediate data fabric 230. Edge switch E1 may be connected to access switch A1 at a first port, edge switch E2 at a second port, and end host 212 at a third port. Edge switch E2 may be connected to access switch A2 at a first port, edge switch E1 at a second port, and end host 214 at a third port. Edge switches E1 and E2 may form at least a portion of main data fabric 232.

During the operation of network 100, end host 210 may send network traffic (e.g., a first network packet) to end host 212. The first network packet may travel along paths indicated by arrows 216, 218, and 220 and arrive at end host 212 by traveling through access switch A1 and edge switch E1. In this scenario, after access switch A1 receives the first network packet, access switch A1 (based on flow table entries and implemented network policy) may determine that end host 212 is not a local end host that is connected to the access group to which access switch A1 belongs. In response, access switch A1 may automatically send the first network packet out of the access group (e.g., out of intermediate data fabric 230) and into main data fabric 232. Switches in main data fabric 232 may route network packets received from intermediate data fabric 230 (e.g., the first network packet) using edge switches and/or core switches as necessary.

In some scenarios, switches in intermediate data fabric 230 may be configured with network topology or network policy information regarding main data fabric 232. As an example, end host 210 may send additional network traffic (e.g., a second network packet) destined for end host 214. Access switch A1 may receive the second network packet from end host 210 as indicated by arrow 222. In this example, access switch A1, in addition to determining that destination end host 214 is a non-local end host, may also determine that edge switch E2 is coupled to end host 214 (e.g., is in the same network domain as end host 214). As such, access switch A1 may perform local routing for the second network packet (e.g., within an access group, within intermediate data fabric 230) to access switch A2 as indicated by arrow 224. Access switch A2 may then forward the second network packet out of the access group (e.g., out of intermediate data fabric 230) and into main data fabric 232 to edge switch E2 as indicated by arrow 226. Edge switch E2 may subsequently forward the second network packet to end host 214 as indicated by arrow 228.

Similarly, access switches A1 may use the same knowledge of network topology to route the first network packet from end host 210 to end host 212 through access switch A1 and edge switch E1 as described in connection with FIG. 11. The resulting path may be the same as described above (e.g., as indicated by arrows 216, 218, and 220). While controller 18 may configure access switches with relevant network topology information about network 100 to more optimally route network packets through network 100, there may be storage limitations for access switches in access groups. As such, if desired, access switches may be configured to route network packets to an edge switch (e.g., the nearest edge switch), and the edge switch may determine the appropriate routing path for the network packet.

The examples in FIG. 11 are merely illustrative. If desired, access and edge switches may receive any suitable settings and configuration information from controller 18 to implement routing paths from any source end host to any destination end host. As an example, if end host 210 was to send a network packet to an end host connected to a different edge switch than edge switches E1 and E2, core switches and other edge switches may perform the corresponding routing operations. As another example, if end host 210 was to send a network packet to an end host connected to the same access group as the access group to which access switches A1 and A2 belong, the corresponding routing operations may involve only access switches (or access switches with optionally one or more edge switches). As yet another example, links coupling edge switches E1 and E2 to access switches A1 and A2 may form a link aggregation group (LAG) that is used to route network packets. By using the link aggregation group, network packets may be routed from intermediate data fabric 230 to main data fabric 232 without having to specify one of the edge switches.

While FIG. 11 describes scenarios in which network packets are routed from source end hosts coupled to intermediate data fabric 230 to destination end hosts coupled to main data fabric 232, this is merely illustrative. Analogous packet routing operations may occur when routing from source end hosts coupled to main data fabric 232 to destination end hosts coupled to intermediate data fabric 230 and/or from source end hosts coupled to a first access group to destination end hosts coupled to a second access group in intermediate data fabric 230 through main data fabric 232. As an example, network packets may be first routed to an edge switch to which an access group associated with a destination end host is attached, the edge switch may then forward the network packets to an appropriate access switch in the access group (e.g., based on access group policy, based on access group topology, etc.). Similarly, once network packets reach an edge switch (from an access switch), the edge switch may route the network packets to any core switch and/or to any other edge switch for forwarding to any end host attached to another edge switch or another access switch.

Figure 12B:
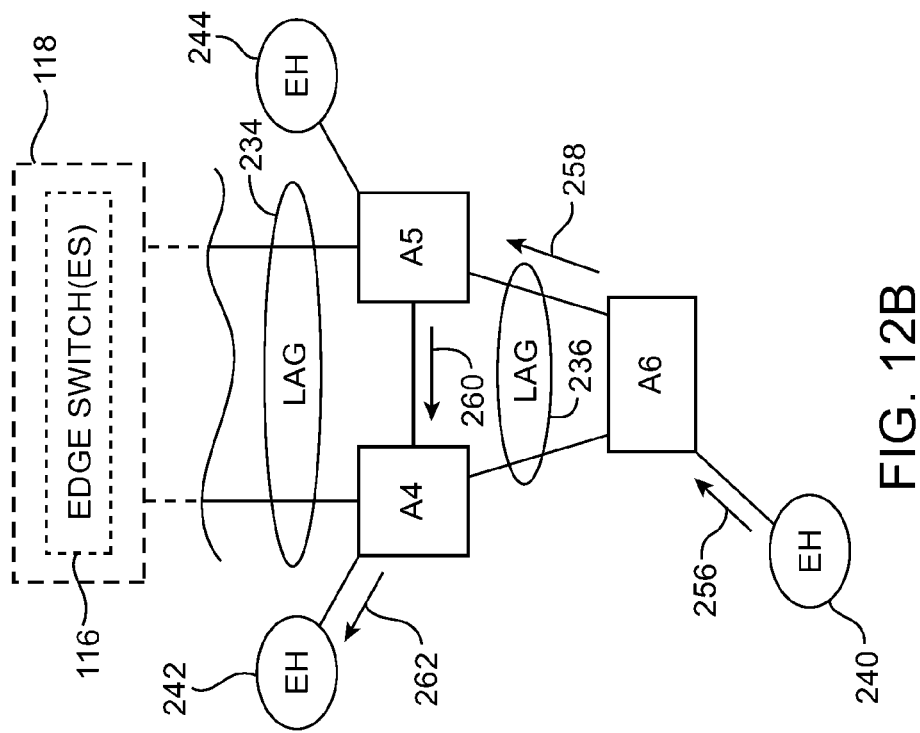
FIGS. 12A and 12B are diagrams of illustrative packet routing schemes within an access switch group in a network in accordance with some embodiments.
Figure 12A:
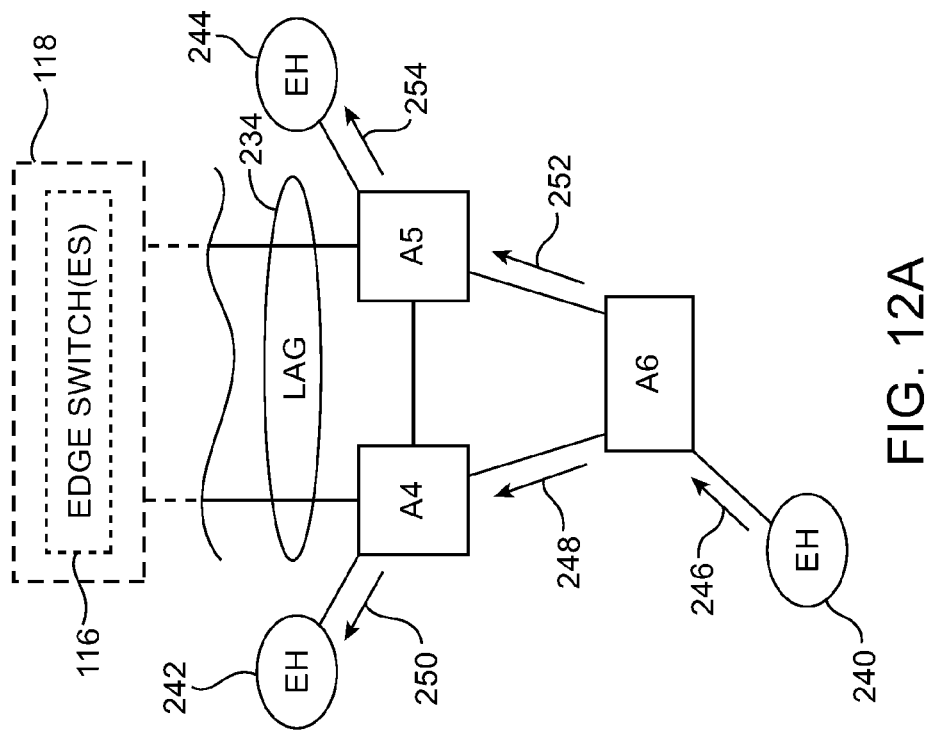

FIGS. 12A and 12B show illustrative paths for routing network traffic within an access group (similar to the access group described in connection with FIG. 8C) in the intermediate fabric portion of network 100. As shown in FIG. 12A, an access group may include access-leaf switches A4 and A5 coupled to one or more edge switches 116 (e.g., two edge switches such as edge switches E1 and E2 in FIG. 11) via link aggregation group 234. The access group may also include access-edge switch A6 coupled to access-leaf switches A4 and A5.

In the example of FIG. 12A, end host 240 connected to access-edge switch A6 may send network packets to access-edge switch A6 as indicated by arrow 246. A first portion of the network packets may be destined for end host 242 connected to access-leaf switch A4 and a second portion of the network packets may be destined for end host 244 connected to access-leaf switch A5. Access-edge switch A6 (as an example) may store flow tables having flow table entries indicative of how access-leaf switch A4 is connected to end host 242 and of how access-leaf switch A5 is connected to end host 244. If desired, access-edge switch A6 may store and/or receive other information from controller 18 that is indicative of how access-edge switch A4 is connected to end host 242 and of how access-edge switch A5 is connected to end host 244. Based on the flow table entries and/or the other information, access-edge switch A6 may route the first portion of the network packets to end host 242 through access-leaf switch A4 as indicated by arrows 248 and 250. Based on the flow table entries and/or the other information, access-edge switch A6 may route the second portion of the network packets to end host 244 through access-leaf switch A5 as indicated by arrows 252 and 254.

In the example of FIG. 12B, paths connecting access-edge switch A6 to access-leaf switches A4 and A5 may be implemented as a link aggregation group such as link aggregation group 236. In this example, network packets from end host 240 may be forwarded from access-edge switch A6 directly to a given access-leaf switch (e.g., one of access-leaf switches A4 or A5). The selected access-leaf switch may then route to a peer access-leaf switch as necessary or may route directly to an end host connected to the access-leaf switch. As an example, access-edge switch may forward a network packet through a path in link aggregation group 236 to access-leaf switch A5 (as indicated by arrow 258). Access-leaf switch A5 may determine that the destination end host for network packet is an end host connected to a peer access-leaf switch (e.g., access-leaf switch A4) may forward the network packet to end host 242 through access-leaf switch A4 (as indicated by arrows 260 and 262).

By using a link aggregation group such as link aggregation group 236, access-edge switch A6 may directly forward network packets to access-leaf switches without performing substantial processing. As such, access-edge switches such as access-edge switch A6 may be implemented using simpler switching or forwarding circuitry. In other words, the larger processing overhead is moved to access-leaf switches. If desired, access-leaf switches may similarly directly forward network packets to edge switches without performing substantial processing to move the larger processing overhead to edge switches such that switches in access groups may be implemented using simpler switching or forwarding circuitry than those in the main fabric portion of network 100.

Figure 13:
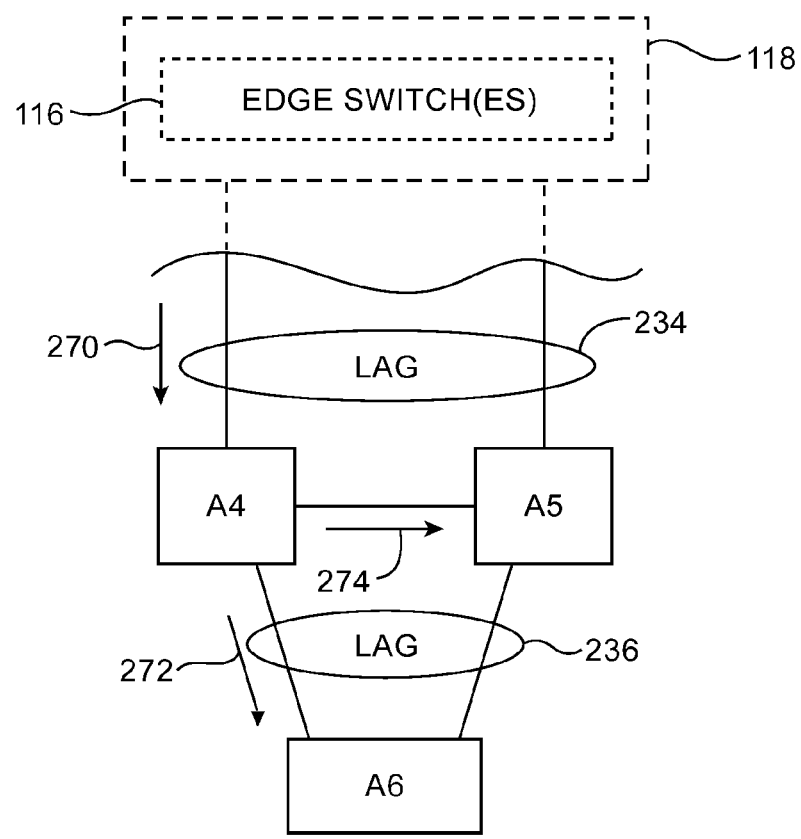
FIG. 13 is a diagram of illustrative packet routing schemes for broadcasting network traffic into an access switch group in a network in accordance with some embodiments.
Figure 14:
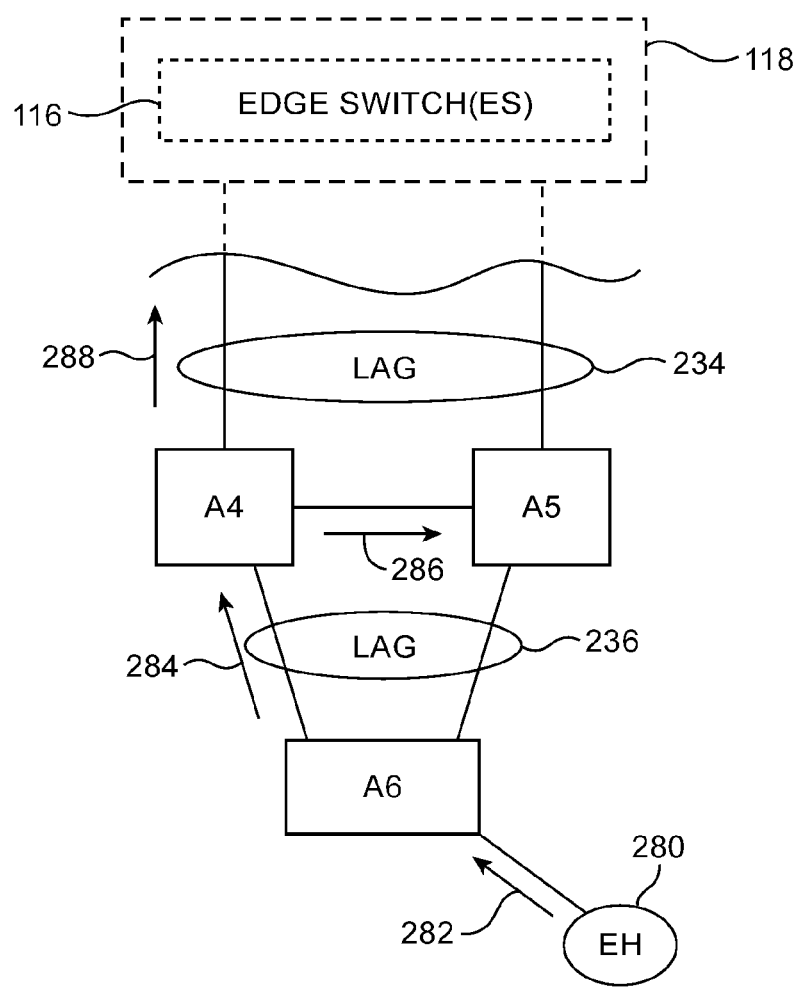
FIG. 14 is a diagram of illustrative packet routing schemes for broadcasting network traffic from an access-edge switch in a network in accordance with some embodiments.
Figure 15:
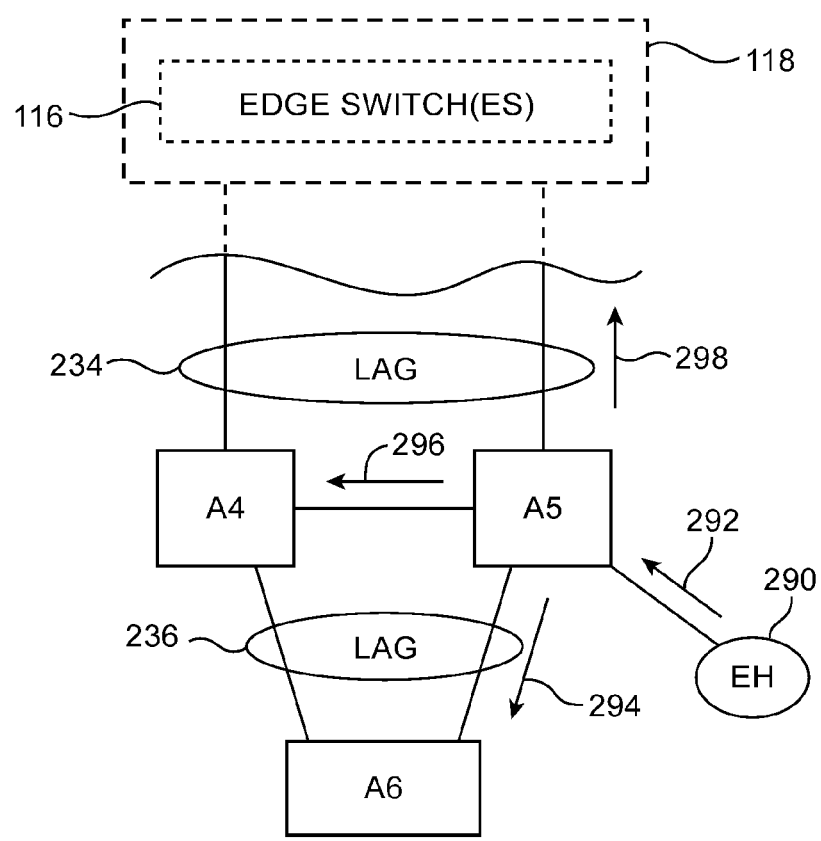
FIG. 15 is a diagram of illustrative packet routing schemes for broadcasting network traffic from an access-edge switch in a network in accordance with some embodiments.

In addition to performing unicast transmission, access switches may also be configured to perform broadcast transmission. FIGS. 13-15 show illustrative examples of an access group performing broadcast transmission based on different source end host locations. In particular, FIG. 13 shows how an access group including access-leaf switches A4 and A5 and access-edge switch A6 may receive a broadcast transmission (e.g., broadcast network packets) from a given edge switch in switches 116 in main fabric portion 118 of network 100. As an example, the broadcast network packets may originate from any suitable location in network 100 such as an end host directly connected to the given edge switch, directly connected to a peer edge switch of the given switch, directly connected to an edge switch in a different rack in that of the given edge switch, or directly connected to access switches from another access group.

Because link aggregation group 234 is implemented to connect edge switches 116 to access-leaf switches, either one of the access-leaf switches may receive the broadcast network packets. In the example of FIG. 13, access-leaf switch A4 may receive the broadcast network packets from edge switches 116 in main fabric portion 118. Access-leaf switch A4 may forward the broadcast network packets to peer access-leaf switch A4 as indicated by arrow 274 and to any other peer access-leaf switches. Access-leaf switch A4 may also forward the broadcast network packets to access-edge switch A6 via link aggregation group 236 as indicated by arrow 272. Although not shown in the example of FIG. 13, if there are additional access-edge switches, access-edge switch A6 may forward the broadcast network packets to the additional access-edge switches. After receiving the broadcast network packets, each of the switches may forward the broadcast network packets to any suitable end hosts attached to the receiving switch.

Controller 18 may implement a network policy in the access group of FIG. 13 to perform the routing operations as indicated by arrows 270, 274, and 272. In particular, controller 18 may provide routing table entries to enforce rules of broadcasting network packets such as that an edge switch may forward a broadcast network packet to a single access-leaf switch, that the receiving access-leaf switch may forward the broadcast network packet to any peer switches and also to a single access-edge switch, that the single access-edge switch may forward the network packet to any peer access-edge switches, and that the access switches receiving the broadcast network packet from a peer access switch only forward the broadcast network packet to other peer access switches if necessary such that there is no duplicative forwarding.

In other words, when a broadcast network packet is received at a first switch of a first type (e.g., type 'core', type 'edge', type 'access-leaf', type 'access-edge'), the first switch of the first type may forward the broadcast network packet to any peer switches all of the first type such as a second switch of the first type. The first switch of the first type may also forward the network packet to switches of a second type and/or a third type. However, the second switch of the first type does not forward the broadcast network packet to switches of any other types.

FIG. 14 shows an exemplary routing configuration when routing from an end host attached to an access-edge switch such as end host 280 attached to access-edge switch A6 to other suitable end hosts connected to network 100. As indicated by arrow 272, access-edge switch A6 may first receive the broadcast network packet from end host 280. Access-edge switch A6 may forward the broadcast network packet to an access-leaf switch.

In the example of FIG. 14, access-edge switch A6 may forward the broadcast network packet to access-leaf switch A4 via link aggregation group 236. Access-leaf switch A4 may forward the broadcast network packet to peer access-leaf switch A5 as indicated by arrow 286. Access-leaf switch A4 may also forward the broadcast network packet to edge switches 116 in main fabric portion 118 over link aggregation group 234 as indicated by arrow 288. Edge switches 116 may then forward the broadcast network packets to other suitable switches in network 100. After receiving the broadcast network packets, each of the switches may forward the broadcast network packets to any suitable end hosts attached to the receiving switch.

The example of FIG. 14 is merely illustrative. If desired, instead of forwarding the broadcast network packet from access-edge switch A6 to access-leaf switch A4, access-edge switch A6 may forward the broadcast network packet to access-leaf switch A5 via link aggregation 236. In this scenario, access-leaf switch A5 may forward the network packet to peer access-leaf switch A4 and also edge switches 116.

FIG. 15 shows an exemplary routing configuration when routing from an end host attached to an access-leaf switch such as end host 290 attached to access-leaf switch A5 to other suitable end hosts connected to network 100. As indicated by arrow 292, access-leaf switch A5 may first receive a broadcast network packet from end host 290 as indicated by arrow 292. Access-leaf switch A5 may subsequently forward the broadcast network packet to peer access-leaf switch A4 as indicated by arrow 296 and to switches in other layers (e.g., of other types) such as access-edge switch A6 as indicated by arrow 294 and edge switches 116 as indicated by arrow 298. Because access-leaf switch A4 received the broadcast network packet from a peer access-leaf switch, access-leaf switch A4 does not forward the broadcast network packet to switches in the other layers (as implemented by an access group policy and/or as implemented in routing table entries of switches in the access group).

The routing examples in FIGS. 11-15 are merely illustrative. If desired, any suitable suiting schemes may be implemented based on network policy and configuration of switches by controller 18.

Figure 16:
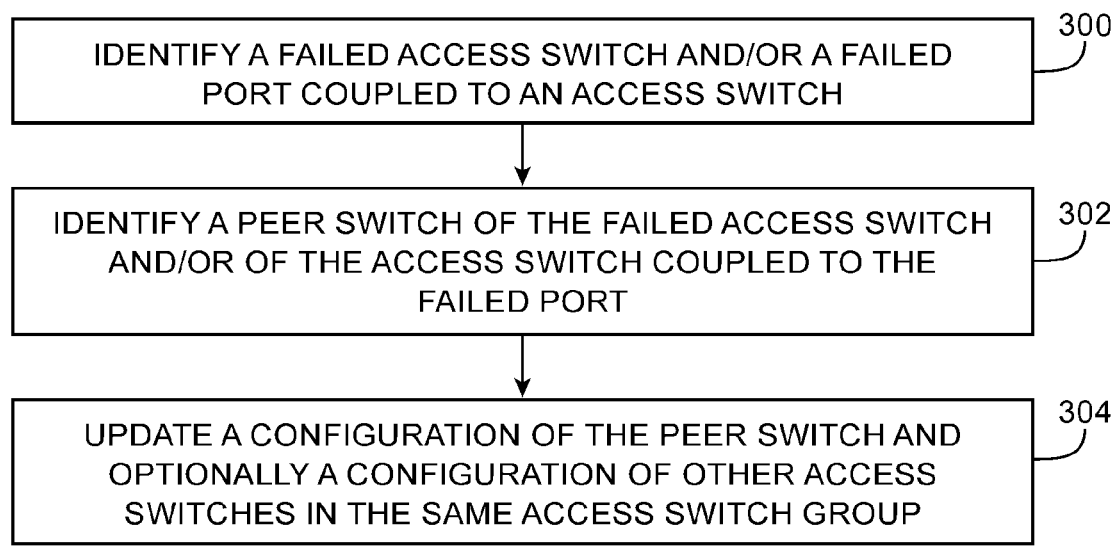
FIG. 16 is a flowchart of illustrative steps for performing failover recovery in an access switch group in a network in accordance with some embodiments.

During operation of switches such as access switches in a network, access switches and/or ports of or coupled to access switches may fail. FIG. 16 shows illustrative steps for mitigating access switch and/or port failures. At step 300, controller 18 may identify a failed access switch and/or a failed port coupled to an access switch. As an example, in FIG. 13, controller 18 may identify that a switch port coupling access-leaf switch A4 to edge switches 116 has failed.

At step 302, controller 18 may identify a peer access switch of the failed access switch (e.g., a switch of the same type of the failed switch) and/or of the access switch coupled to the failed port. Further in relations to the port failure example of FIG. 13 described above, controller 18 may identify peer access-leaf switch A5 and how link aggregation group 234 also couples peer access-leaf switch A5 to edge switches 116. As such, controller may identify that edge switches may control to route network packets to the access group of FIG. 13 through access-leaf switch A5.

At step 304, controller 18 may update a configuration of the peer access switch and optionally a configuration of the other access switches in the same access switch group. Further in relations to the port failure example of FIG. 13 described above, controller 18 may update a configuration of peer access-leaf switch A5 to receive network packets from edge switches 116 in main fabric portion 118 and to forward network packets to peer access-leaf switch A4 as necessary. Controller 18 may also optionally update the configuration of access switches A4 and A6 to accommodate the changes of access switch A5 as necessary to implement the desired access group policy while mitigating the port and/or switch failure.

Controller 18 and client switches 14 may be configured to perform the above-described operations (e.g., the operations of FIGS. 1-16) using hardware such as circuitry (e.g., processing circuitry in controller 18 and/or client switches 14) and/or software such as code (e.g., pseudo-code instructions) that runs on hardware. Code for performing such operations may be stored on non-transitory computer readable storage media. The code may sometimes be referred to as data, software, program instructions, code, or instructions. The non-transitory computer readable storage media may include non-volatile memory, removable media such as one or more removable flash drives, one or more hard drives or disks, other computer readable media, or combinations of these or other storage. Code (software) stored on the non-transitory computer readable media may be executed by processing circuitry on controller 18, switches 14, and/or network flow information generation circuitry 124 if desired. This processing circuitry may include central processing units (CPUs), integrated circuits such as application-specific integrated circuits with processing circuitry, microprocessors, or other processing circuitry.

The foregoing is merely illustrative of the principles of this invention and various modifications can be made by those skilled in the art without departing from the scope and spirit of the invention.

What is claimed is:

1. A method of operating a controller to control a network having a leaf switch implemented on a network rack, a spine switch coupled to the leaf switch, and an access switch coupled to the leaf switch the method comprising:
   with the controller, identifying an end host directly coupled to a port of the access switch and identifying a port of the leaf switch directly coupled to an additional port of the access switch, wherein the access switch is implemented on switching circuitry separate from the network rack; and
   with the controller, controlling the access switch to forward network traffic between the end host and the spine switch via the leaf switch.

2. The method defined in claim 1, wherein the leaf switch is coupled between the access switch and the spine switch, and an additional leaf switch implemented on the network rack is coupled between the access switch and the spine switch.

3. The method defined in claim 2, further comprising:
   with the controller, controlling the access switch to forward the network traffic between the end host and the spine switch via the additional leaf switch.

4. The method defined in claim 3, further comprising:
   with the controller, identifying an additional end host that is implemented on the network rack and that is directly coupled to at least one of the leaf switch or the additional leaf switch, wherein the end host is implemented separately from the network rack.

5. The method defined in claim 4, further comprising:
   with the controller, controlling the access switch to forward network traffic between the end host and the additional end host through the one of the leaf switch or the additional leaf switch to which the additional end host is directly coupled.

6. The method defined in claim 2, wherein an additional access switch is coupled to the access switch to form an access group, the leaf switch is coupled between the additional access switch and the spine switch, and the additional leaf switch is coupled between the additional access switch and the spine switch.

7. The method defined in claim 1, wherein the access switch is not directly connected to the spine switch.

8. A method of using a controller that controls switches in a packet forwarding network including an access switch group, a core switch, and an edge switch coupled between the access switch group and the core switch the method comprising:
   with the controller, identifying a first access switch in the access switch group having a first link to the edge switch;
   with the controller, identifying a second access switch in the access group having a second link to the edge switch; and
   with the controller, identifying a peer access switch link between the first and second access switches.

9. The method defined in claim 8, further comprising:
   with the controller, configuring the core switch with a first setting associated with a first switch type; and with the controller, configuring the edge switch with a second setting associated with a second switch type that is different from the first switch type.

10. The method defined in claim 9, further comprising:
with the controller, configuring the first and second access switches with a third setting associated with a third switch type that is different from the first and second switch types.

11. The method defined in claim 10, wherein switches of the first switch type are only coupled to other switches, and switches of the second and third types are coupled to end hosts and other switches.

12. The method defined in claim 8, further comprising:
with the controller, identifying a third access switch in the access switch group coupled to the edge switch through at least one of the first access switch or the second access switch.

13. The method defined in claim 12, further comprising:
with the controller, identifying end hosts directly coupled to the edge switch, the first access switch, the second access switch, and the third access switch.

14. The method defined in claim 8, wherein the edge switch and an additional edge switch are implemented as top-of-rack switches for a network rack, and the additional edge switch is coupled between the access switch group and the core switch.

15. The method defined in claim 8, further comprising:
with the controller, identifying an additional access switch group that is indirectly connected to the access switch group through the edge switch.

16. A method of operating computing equipment to control switches in a network having end hosts that are coupled to ports of the switches, the method comprising:
with the computing equipment, identifying a first set of switches, each of which is coupled to each of the end hosts through at least one connecting switch, as a core switch type;
with the computing equipment, identifying a second set of switches, at least a portion of which is directly coupled to a portion of the end hosts, as an edge switch type, wherein the at least one connecting switch comprises one of the second set of switches; and
with the computing equipment, identifying a third set of switches, each of which is coupled to each switch of the core switch type through at least one intervening switch and at least a portion of which is directly coupled to an additional portion of the end hosts, as an access switch type, wherein the at least one intervening switch comprises a switch in the second set of switches.

17. The method defined in claim 16, wherein the second set of switches are implemented on a plurality of network racks.

18. The method defined in claim 17, wherein the third set of switches are implemented on switching circuitry separate from the plurality of network racks.

19. The method defined in claim 16, wherein the identifying the third set of switches comprises:
identifying switches of a first subtype in the third set of switches that are directly coupled to at least one of the switches in the second set of switches; and
identifying switches of a second subtype in the third set of switches that are coupled to at least one of the switches in the second set of switches through a correspond switch in the switches of the first subtype.

20. The method defined in claim 19, wherein a first end host in the additional portion of the end hosts is directly coupled to a switch in the switches of the first subtype and a second end host in the additional portion of the end hosts is directly coupled to a switch in the switches of the second subtype.

* * * * *